March 30, 1926.
F. H. COMEY
TRACTIVE COVER FOR TIRES
Filed June 17, 1920
1,578,803
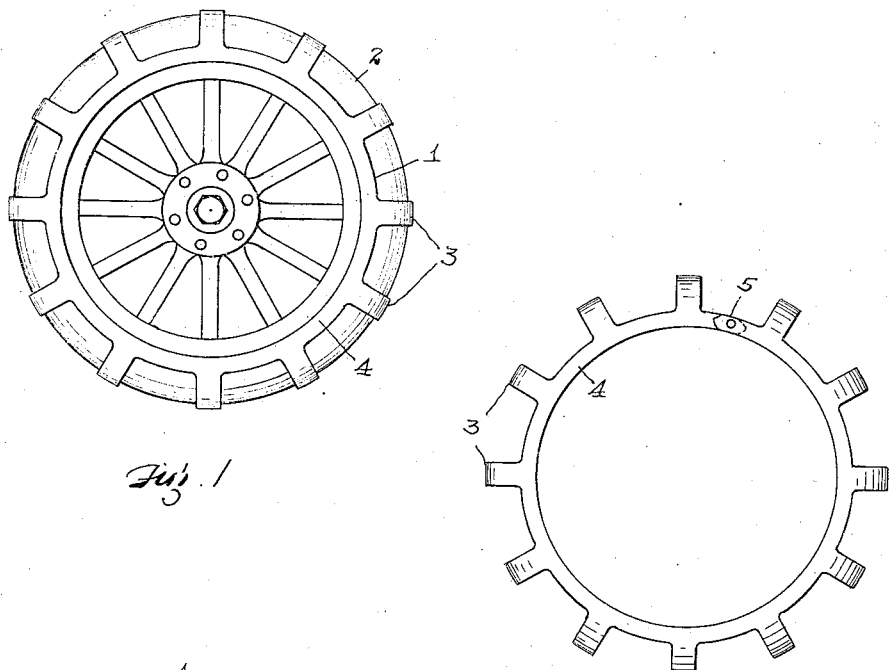
Fig. 1
Fig. 3
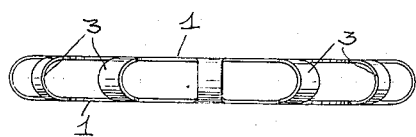
Fig. 2
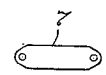
Fig. 5
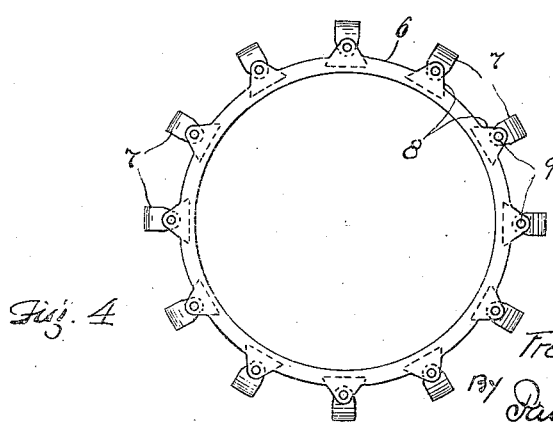
Fig. 4
Inventor
Frederick H. Comey
By Ray. Oberlin & Day
Attorneys Patented Mar. 30, 1926.

1,578,803

UNITED STATES PATENT OFFICE.

FREDERICK H. COMEY, OF AKRON, OHIO, ASSIGNOR TO THE FALLS RUBBER COMPANY, OF CUYAHOGA FALLS, OHIO, A CORPORATION OF OHIO.

TRACTIVE COVER FOR TIRES.

Application filed June 17, 1920. Serial No. 389,549.

*To all whom it may concern:*

Be it known that I, FREDERICK H. COMEY, a citizen of the United States, and a resident of Akron, county of Summit, and State of Ohio, have invented a new and useful Improvement in Tractive Covers for Tires, of which the following is a specification, the principle of the invention being herein explained and the best mode in which I have contemplated applying that principle, so as to distinguish it from other inventions.

The present improvements, relating, as indicated, to tractive covers for tires, have more particular regard to a device capable of being detachably secured to a pneumatic tire on a vehicle, such as an automobile, for the purpose of increasing the tractive effect when a slippery roadway is encountered. The so-called "Weed chain" is a well known expedient for use in this connection, but despite the wide extent of such use, has never been entirely satisfactory, for the reason that such chain subjects the tire to unnecessary wear, and, in addition, is noisy, particularly when allowed to strike the fenders, wears rapidly and is more or less harmful to the pavement if not removed upon passing from a bad stretch of road onto one that has been improved. The object of the present invention, accordingly, is to provide a skeleton cover composed of rubber or other elastic material, including rubber and fabric, capable of conforming to the contour of the tire to which it is to be applied, and adapted to overcome the objections above referred to.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a side elevation of a vehicle wheel with tire, having mounted in place on the latter one form of my improved tractive device; Fig. 2 is an edge view of such device by itself; Fig. 3 is a side elevation of a modified form of the device regarded by itself; Fig. 4 is a view similar to Fig. 3, but showing a still further modification in form; and Fig. 5 is a plan view of one of the elements entering into the construction of such last form.

As previously indicated, my improved device consists primarily of a skeleton cover, composed of rubber or other elastic material, including rubber and fabric, capable of conforming to the contour of the tire to which it is to be applied. In the first form of the device illustrated in the drawing (Figs. 1 and 2), the device is shown as composed of two elastic rings 1 of rubber, or rubber and fabric, the diameter of said rings being less than the outside diameter of the tire 2 when mounted on the wheel in normal inflated condition. Said rings are connected together by a plurality of integral cross-bars or straps 3 of the same material as the rings, these cross-bars being of such width and frequency as to provide an adequate number of grips for engaging with a slippery pavement or muddy road. The width (circumferential length) of said cross-bars is, however, less than the circumferential length of the intervening spaces, as I find that this contributes to keeping the device in place on the tire when the vehicle is rounding curves. The device or cover as a whole is best shown perhaps in Fig. 2, it being understood that the rings 1 are adapted to lie against the respective sides of the tire, while the cross-bars 3 closely fit the transverse curvature of such tire, being held in place by the tension of the rings.

In other words, in the form just described, my device, it will be seen, is made all in one piece, which, owing to the nature of the material, may be stretched over the tire by simply jacking up the wheel or by advancing the wheel over one portion of the device itself, and pulling or stretching the remainder over the tire. Once it has been applied, the nature of the material of which my device is composed, is such that the cross-bars or straps are of better tractive effect than metal chains in situations such as mud and loose snow. The nature of the material of which the cross-bars or straps are composed is also less injurious to the tire than metal, and at the same time less harmful to the pavement on which the tires are run. A further practical advantage is that the device eliminates the noise which is an annoying feature where metal chains are used. It will wear much longer than a metal chain and has a higher resistance to breakage. The nature of the device and the material which composes it, also gives to the device the ability to creep around the tire in the same manner as metal devices, thus distributing such wear as may occur. It is comparatively easy to apply and remove, but such application and removal are required less frequently than with a metal chain, for the device can be left on during long periods of use without annoyance to the occupants of the vehicle, with no injury to the tire, and with very slow wear.

To make a device or tractive cover of the character described, the cavity for the device itself will preferably be engraved or cut upon a metal core or form of predetermined size, smaller than the tire which is to be fitted. The rubber, or other elastic material, to fill the cavity thus engraved on the form, is stamped out approximately as required and inserted in the cavity in the usual manner for making molded rubber goods. Where fabric is used in the construction of the device, a layer of rubber will first be inserted in the engraved portion of the core, then a layer of fabric, and then a second layer of rubber, as many as desired. The prepared core is then enclosed in a suitable mold, which will subject the rubber to pressure, and while in this condition heat is applied in the usual manner so as to vulcanize such rubber to the desired degree. It is not essential that the device shall be molded to the transverse contour of a tire, so long as it conforms substantially to such contour when applied.

While one of the advantages involved in the use of my improved tractive device is that it is not necessary, in view of the extensible character of the rings 1, to split these, in order to place the device on a tire, I do not limit myself to the form just described, since the other advantageous features are still retained where, as shown in Fig. 3, one or both of the rings 4 is split at a suitable point in its circumference in order to facilitate the application of the device and its removal. In such case I may make the device as a straight piece, shaped to the cross-sectional contour of the tire, and not to the circumferential contour. The split ends of the side ring or rings will be fitted with suitable buckles 5, whereby they may be secured together.

In the second modification, shown in Figs. 4 and 5, while I employ continuous side rings 6, the cross-bars 7 are in the form of separate units or straps adapted to be detachably secured to said side rings. To this end I insert ears or tabs 8 at circumferentially spaced points about each ring, these fasteners being securely vulcanized into and made a part of the ring itself.

Any suitable form of hook or like securing device 9 may be employed to detachably secure the ends of the cross-bars or straps to said ears or tabs 8. In this form of the device I secure the added advantage that the straps are individually replaceable when worn or destroyed in service without it being necessary to discard the entire device.

It will of course be understood that in any of the forms of construction just described, my improved device may be made in a variety of ways familiar in the art of making molded rubber goods, the method of manufacture hereinbefore described in connection with the first form of the device being given merely by way of illustration.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A tractive device for tires, comprising a detachable skeleton cover essentially of elastic rubber construction adapted to conform to the contour of the tire to which it is to be applied.

2. A tractive device for tires, comprising a detachable skeleton cover of elastic construction including rubber, said cover being formed to the contour of the tire to which it is to be applied and being held in place when thus applied by its own strength and elasticity.

3. A tractive device for tires, comprising a detachable skeleton cover of suitable elastic material including rubber and fabric, said cover being formed to the contour of the tire to which it is to be applied and being held in place when thus applied by its own strength and elasticity.

4. A tractive device for tires, comprising two rings of elastic construction of less diameter than that of the tire to which the device is to be applied, and a plurality of transversely disposed straps of similar material connecting said rings.

5. A tractive device for vehicle tires comprising an endless band consisting of elastic side rings adapted to be stretched over the tire and elastic cross members integrally united with said rings and separated by open spaces of greater circumferential length than that of said cross-bars.

6. An over-tread for vehicle tires comprising an open-work band adapted to be detachably mounted upon the tire and including solid cross bars of a highly-stretchable and resilient nature having soft rubber as their principal strain-resisting component.

7. An over-tread for vehicle tires comprising an endless band of vulcanized soft rubber of an open-work construction, including a resilient side ring adapted to be stretched over the tire in applying the device to and removing it from the tire, and resilient cross-members integrally united with said side ring.

8. An over-tread for vehicle tires comprising an endless band composed substantially wholly of soft vulcanized rubber compound and shaped to the circumferential and transverse contour of the tire, said band including resilient side rings adapted to occupy an intermediate position on the sides of the tire, and resilient cross-bars integrally united therewith.

9. A protective covering for pneumatic tires, composed of a unitary cover of U-shape in cross-section, having broad continuous marginal parts adapted to lie upon the sides of a pneumatic tire on which said cover is used, and a tread covering portion connected with said marginal parts and adapted to extend over the tread of such tire and to be confined thereon by the holding action of said marginal parts, said tread covering portion being provided with openings through which such tire is exposed.

10. A protective covering for a pneumatic tire composed of a unitary piece of flexible material, of substantially U-shape in cross-section having broad annular marginal parts, and an intervening tread covering portion, having openings therethrough at which the tire is uncovered.

Signed by me, this 15th day of June, 1920.

FREDERICK H. COMEY.